United States Patent [19]
Johnson et al.

[11] Patent Number: 5,862,313
[45] Date of Patent: Jan. 19, 1999

[54] RAID SYSTEM USING I/O BUFFER SEGMENT TO TEMPORARY STORE STRIPED AND PARITY DATA AND CONNECTING ALL DISK DRIVES VIA A SINGLE TIME MULTIPLEXED NETWORK

[75] Inventors: Timothy J. Johnson; Alan R. Rivers, both of Eau Claire, Wis.

[73] Assignee: Cray Research, Inc., Eagan, Minn.

[21] Appl. No.: 650,632

[22] Filed: May 20, 1996

[51] Int. Cl.$^6$ .............................. G06F 13/00; G06F 11/00
[52] U.S. Cl. ........................ 395/182.04; 395/182.07; 395/182.03; 395/872; 711/118
[58] Field of Search ................ 395/182.04, 182.05, 395/182.02, 182.03, 872; 371/40.15; 359/161; 711/118

[56] References Cited

U.S. PATENT DOCUMENTS

| | | | |
|---|---|---|---|
| 4,845,710 | 7/1989 | Nakamura et al. | 370/360 |
| 4,866,704 | 9/1989 | Bergman | 370/452 |
| 5,134,619 | 7/1992 | Henson et al. | 371/40.15 |
| 5,195,100 | 3/1993 | Katz et al. | 395/182.2 |
| 5,233,618 | 8/1993 | Glider et al. | 395/182.04 |
| 5,258,984 | 11/1993 | Menon et al. | 395/182.05 |
| 5,271,012 | 12/1993 | Blaum et al. | 395/182.04 |
| 5,274,799 | 12/1993 | Brant et al. | 395/182.04 |
| 5,289,470 | 2/1994 | Chang et al. | 711/173 |
| 5,303,244 | 4/1994 | Watson | 395/182.03 |
| 5,345,565 | 9/1994 | Jibbe et al. | 395/310 |
| 5,381,534 | 1/1995 | Shi | 395/200.33 |
| 5,402,428 | 3/1995 | Kakuta et al. | 395/182.07 |
| 5,432,784 | 7/1995 | Ozveren | 370/235 |
| 5,452,330 | 9/1995 | Goldstein | 375/257 |
| 5,452,444 | 9/1995 | Solomon et al. | 395/182.4 |
| 5,457,683 | 10/1995 | Robins | 370/258 |
| 5,499,337 | 3/1996 | Gordon | 395/182.04 |
| 5,513,192 | 4/1996 | Janku et al. | 371/50.1 |
| 5,519,844 | 5/1996 | Stallmo | 711/114 |
| 5,522,031 | 5/1996 | Ellis et al. | 395/182.04 |
| 5,530,948 | 6/1996 | Islan | 395/182.04 |
| 5,535,035 | 7/1996 | DeFoster et al. | 359/161 |
| 5,590,124 | 12/1996 | Robins | 370/258 |
| 5,594,869 | 1/1997 | Hawe et al. | 395/187.01 |
| 5,617,409 | 4/1997 | Ozveren et al. | 370/235 |

OTHER PUBLICATIONS

Gustavson, D B, "The Scalable Coherent Interface and Related Standards Projects", *IEEE Micro*, 10–22, (Feb., 1992).

"IEEE Standard for Scalable Coherent Interface (SCI)", *IEEE Std 1596–1992*, 1–248, (Mar. 1992).

Patterson, D A, et al., "A Case For Redundant Arrays Of Inexpensive Disks (RAID)", *University of California at Berkeley, Report No. UCB/CSD 87/391*, (Dec. 1987).

Scott, S, "The SCX Channel: A New, Supercomputer–Class System Interconnect", *HOT Interconnects III*, Abstract, pp. 1–11, (Aug. 1–11, 1995).

*Primary Examiner*—Le Hien Luu
*Attorney, Agent, or Firm*—Schwegman, Lundberg Woessner, and Kluth, P.A.

[57] ABSTRACT

A system and method for implementing a serial RAID system. Data is striped for the array of disk drives and parity for the striped data is calculated and the resulting data and is written serially to a RAID system over a Fibre Channel or other type of network. The system also allows reading of the striped data and parity serially from the disk array.

11 Claims, 9 Drawing Sheets

RAID SYSTEM USING I/O BUFFER SEGMENT TO TEMPORARY STORE STRIPED AND PARITY DATA AND CONNECTING ALL DISK DRIVES VIA A SINGLE TIME MULTIPLEXED NETWORK

STATEMENT REGARDING GOVERNMENT RIGHTS

The present invention was made with government support under MDA 972-95-3-0032, awarded by ARPA. The Government has certain rights in this invention.

FIELD OF THE INVENTION

The present invention relates to computer systems and in particular to computer storage systems.

BACKGROUND

As computer systems have advanced, the instructions-per-second rate has dramatically increased. Disk drive performance has not been able keep up with computer technological progress. I/O bottlenecking results from a disparity between computer system speed and disk access speed. Another concern with disk storage is its reliability. In 1987, a system was introduced to alleviate the concerns of I/O performance and data reliability. This system, called RAID, for Redundant Array of Inexpensive Disks, consists of several methods of writing data to an array of common disks. The third method, called RAID-3, stripes (i.e., interleaves) words of data across the parallel array of drives as well as stores parity data on the array. RAID-3 is useful for transfers of larger blocks of data. The fifth method, called RAID-5, stripes sectors of data across the drives. RAID-5, like RAID-3 stores parity data, however on a RAID-5 system, the parity data is interleaved among all the drives rather than being written to a disk drive dedicated to parity data. [See, David A. Patterson, Garth Gibson, Randy H. Katz, "A Case for Redundant Arrays of Inexpensive Disks (RAID)," University of California at Berkeley, Report No. UCB/CSD 87/391, December 1987] The parallellism of the disk array allows writes to be done simultaneously, thus the increase in disk performance.

A parallel array of disk drives has disadvantages. The primary disadvantage is that each disk drive requires a separate I/O channel. Thus, for an array of five disk drives (called a 4+1 array, indicating 4 drives dedicated to data storage and one for parity), five disk drive I/O channels must be implemented. The need for a separate channel for each disk drive increases the cost of implementing RAID systems. What is needed is a way to get the benefits of a disk array without the cost of allocating a channel to each disk drive.

SUMMARY OF THE INVENTION

Serial implementations of RAID systems are herein described. An array of inexpensive disks are connected in a Fibre Channel ring network in a serial loop rather than in parallel. Data is striped and parity generated before being written to the array of disks. In one embodiment, the RAID system takes four words of data and stripes the data to create four single words which are then sent to the I/O buffer to be written to the array of disks. The parity of the four words is written to a disk storage device dedicated for that purpose. In another embodiment, striping and parity generation is done by sectors. When retrieved from the disks, the parity information allows the system to determine whether corruption of the data has occurred. If the problem drive can be isolated, then the corrupted data can be reconstructed from the remaining data and the parity information. In the serial RAID system, having the array of disk drives connected serially so that only one I/O channel is needed to interface with the RAID system allows the RAID systems so described to maintain the disk performance offered by the RAID methodology without sacrificing multiple I/O channels.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements labelled with the same number perform essentially the same functions.

Figure 1:
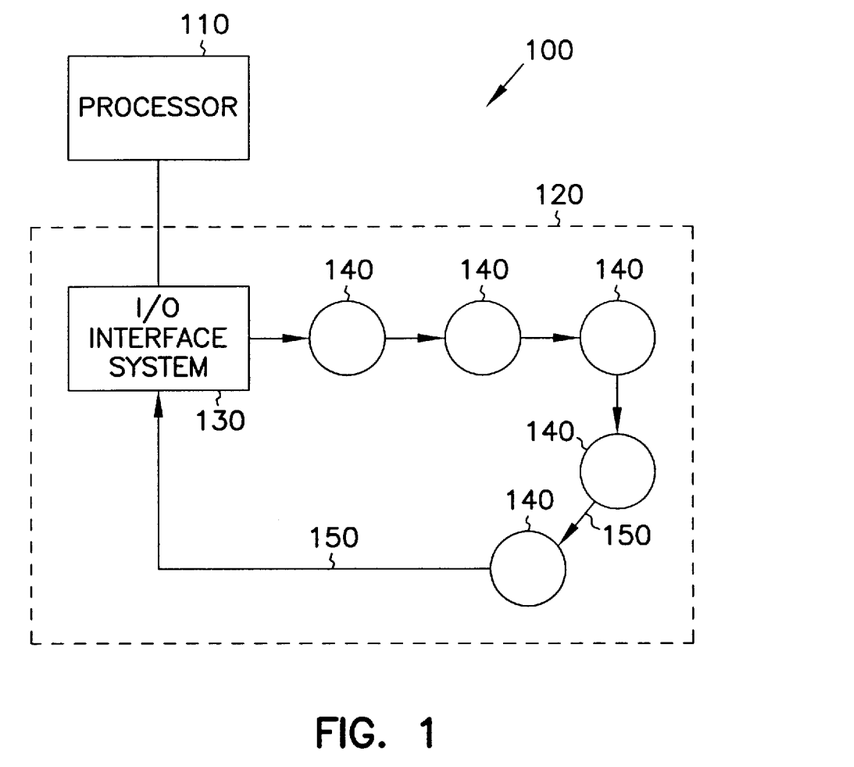
FIG. 1 is a block diagram of a computer system having one embodiment of the serial RAID system, including an I/O interface system and a ring array of disk storage devices.

FIG. 1 is a block diagram showing a computer system 100 having a processor 110 connected to a serial RAID system 120. Serial RAID system 120 includes a I/O interface system 130 connected to a plurality of disk drives 140 over a time multiplexed network formed by communication line 150. In one embodiment, communication line 150 is a Fibre Channel network, in which the disk drives are connected in a serial loop configuration with the output of one disk drive going to the input of the next disk drive. In another embodiment, a bus network topology could be used. Having a time multiplexed network allows I/O interface system 130 to connect to disk drives 140 using only a single I/O channel rather than needing one I/O channel for each of the separate disk drives.

In one of its embodiments, serial RAID system 120 has two primary functions: (1) managing the writing of data to the ring array of disk storage devices and (2) managing the retrieval of data from the disk storage devices.

Figure 2:
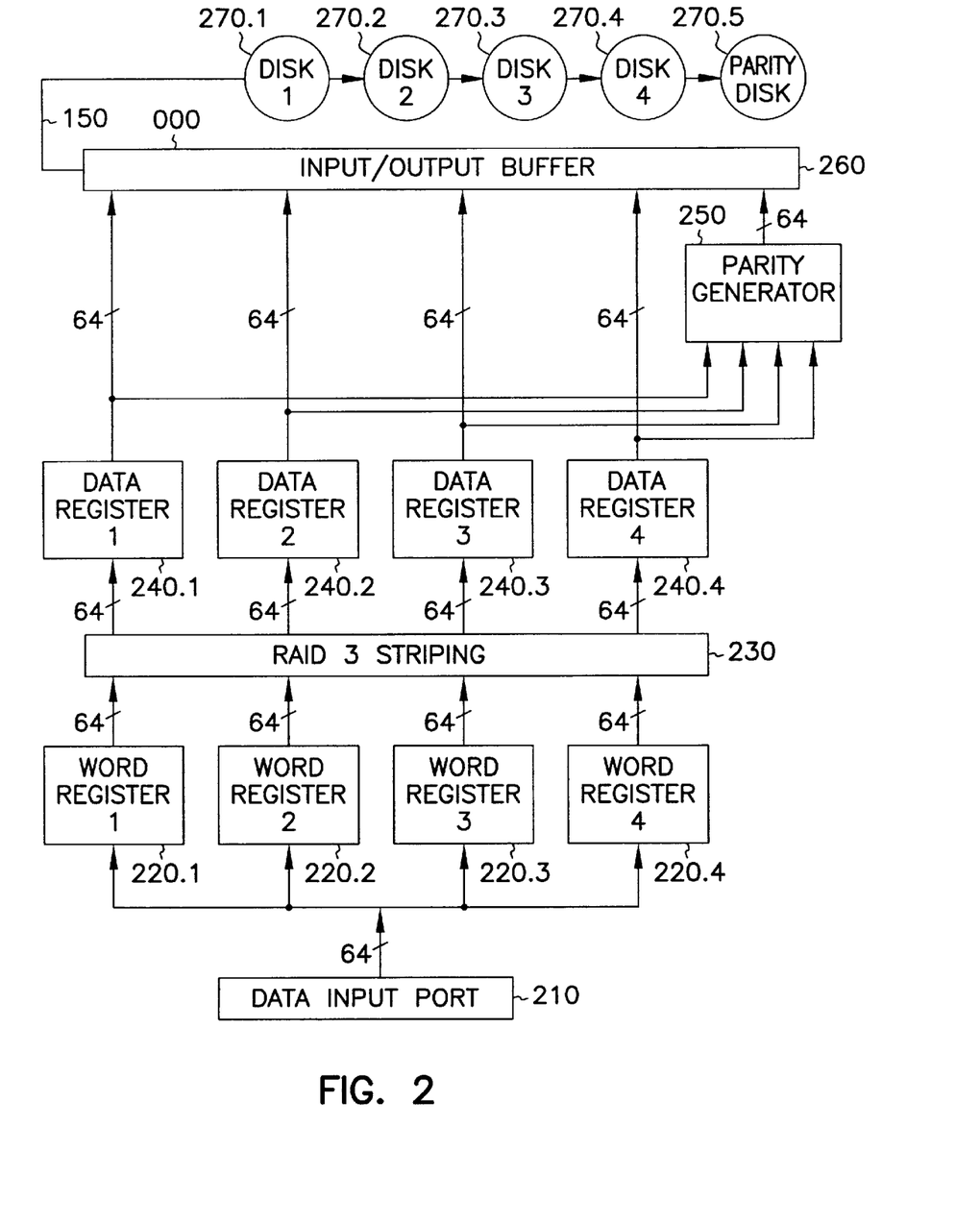
FIG. 2 is a block diagram of the RAID-3 processor, showing the structure of a striped write to the disk drive array.

FIG. 2 is a diagram of one embodiment of a RAID processor 200, which is an element of I/O interface system 130. In this diagram, the writing of RAID-3 striped data to array of disks 140 is shown. In FIG. 2, RAID processor 200 uses a ring array of n+1 disk drives 140 for data to be spread over n drives and one parity disk. Data is received at data input port 210 as a string of 64-bit words. Data is accumulated in Word registers 220.1 through 220.4. Once the Word registers are loaded with data, the striping circuitry 230 stripes the data and the striped words of data are stored in data registers 240.1 through 240.4. RAID-3 parity generator 250 creates the parity word and the five words (four data words and one parity word) are moved to Input/Output buffer 260 to be written the disk array 270.1 through 270.5 over communication line 150.

Figure 2A:
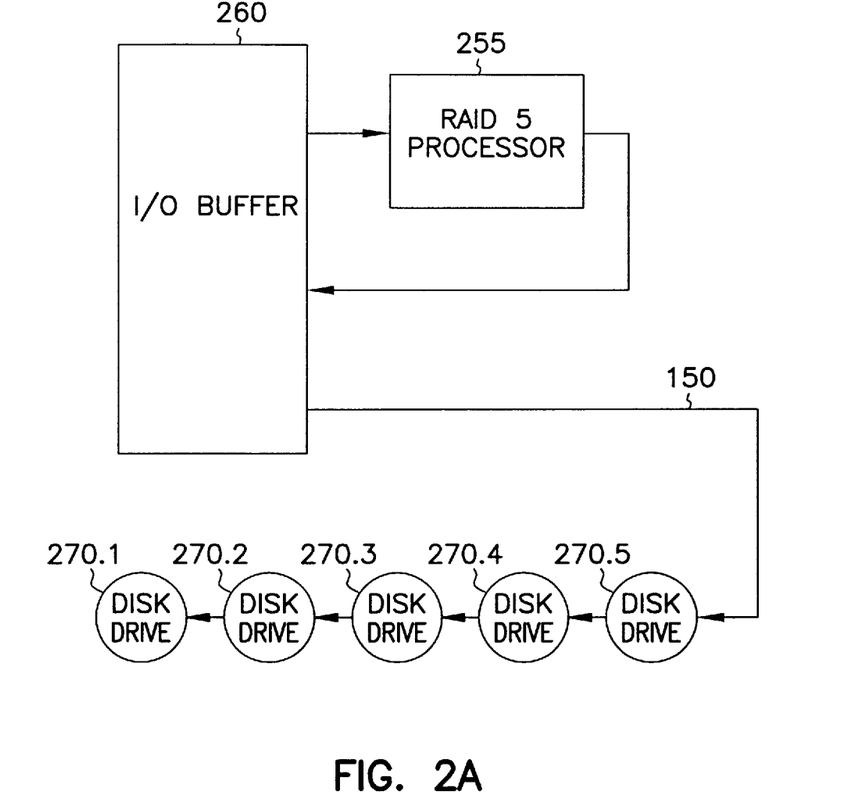
FIG. 2A is a block diagram of a RAID-5 processor, showing the structure of the parity generation and movement of striped data and parity to the disk drive array.

In a similar fashion, FIG. 2A is a block diagram of a serial RAID-5 system. Here, the striped data resides in I/O buffer 260. RAID-5 parity generator 255 uses the striped data to generate corresponding parity data, which is moved to I/O buffer 260 to be written to the disk array 270.1 through 270.5 over communication line 150. Notice that both embodiments which are shown by FIGS. 2 (RAID-3) and 2A (RAID-5) generate parity data, store the parity data in I/O buffer 260 and write the data and parity to a serial array of disk drives 270.1 through 270.5.

Figure 3:
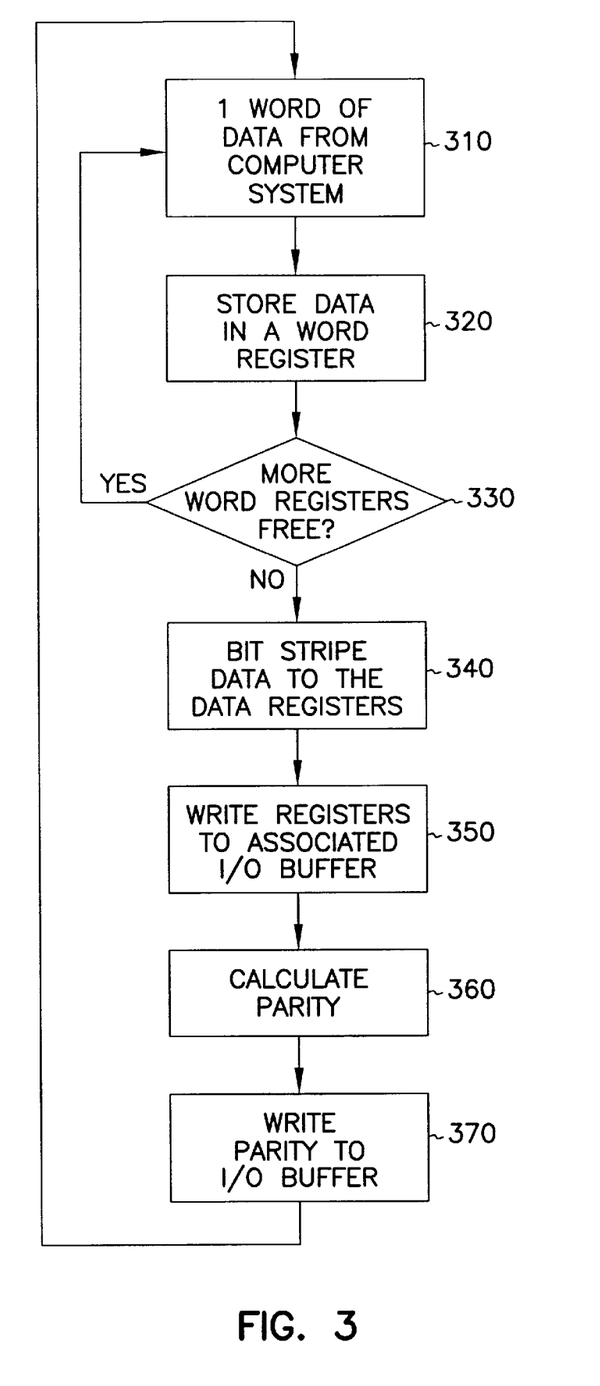
FIG. 3 is a flowchart of the activities handled by one embodiment of the serial RAID-3 system in preparing data to be written to the disk storage devices.

FIG. 3 is a flowchart showing how I/O interface system 130 stores data, in one RAID-3 embodiment, on the array of disk drives 270.1 through 270.5. In step 310, data is received from processor 110 and is stored, at step 320, in word registers 220.1 through 220.4. There is one word register associated with all but one of the disk drives. A check is made at step 330 to determine if word registers 220 have all been loaded with data. If so, then I/O interface 130 stripes the data in the word registers 220, at step 340, and stores the results in data registers 240.1 through 240.4 at step 350. A data register is provided for all but one of the disk drives. At step 350, the striped data is written to I/O buffer 260. At step 360, parity is calculated for the striped data and it is written to I/O buffer 260 at step 370. The end result of this RAID-3 striping procedure is to store words of data striped across disk array 270.1 through 270.4 with each set of striped words having a corresponding striped parity word in I/O buffer to be written to one of the disk drives 270.5, which is reserved for parity data.

In a similar fashion, a RAID-5 embodiment of serial RAID system 120 receives data from processor 110. But instead of generating parity for each set of data words, a RAID-5 embodiment stripes entire sectors of data, without generating parity, to I/O buffer 260. Thus, the end result of the RAID-5 implementation is like that of the RAID-3 implementation; data is stored in I/O buffer 260 to be striped across disk array 270.1 through 270.5. In a RAID-5 implementation of serial RAID system 120, parity data is generated after I/O buffer 260 has been loaded with data. Such RAID-5 parity generation is described in "RAID-5 Parity Generation and Data Reconstruction," U.S. patent application Ser. No. 08/650,336, filed herewith now pending, the details of which are incorporated by reference.

In one embodiment of serial RAID system 120, when I/O buffer 260 is filled with a preset amount of striped data (perhaps 1 sector per disk drive), a Fibre Channel controller will ensure that the data is written to the correct disks. In other embodiments of serial RAID system 120, the writing of the disk drives may be controlled by RAID processor 200 itself.

Regardless of whether data is striped into I/O buffer 260 and then RAID-5 parity is generated or whether data gets striped and parity generated in a RAID-3 process, the present invention takes the data and parity from I/O buffer 260 and writes it to disk array 270.1 through 270.5, serially. Such a serial RAID system utilizing a single disk channel system is able to equal the disk performance of a traditional parallel RAID system due to the employment of a communication line such as Fibre Channel. Because Fibre Channel has a current bandwidth of 106.25 MB/s, a single Fibre Channel has enough bandwidth to support a serial chain of current and near future disk drives without sacrificing performance. Therefore, even though the data is written serially, there is none of the bottlenecking caused by using only a single channel of traditional medium communication line to the array of disk drive devices.

Figure 4:
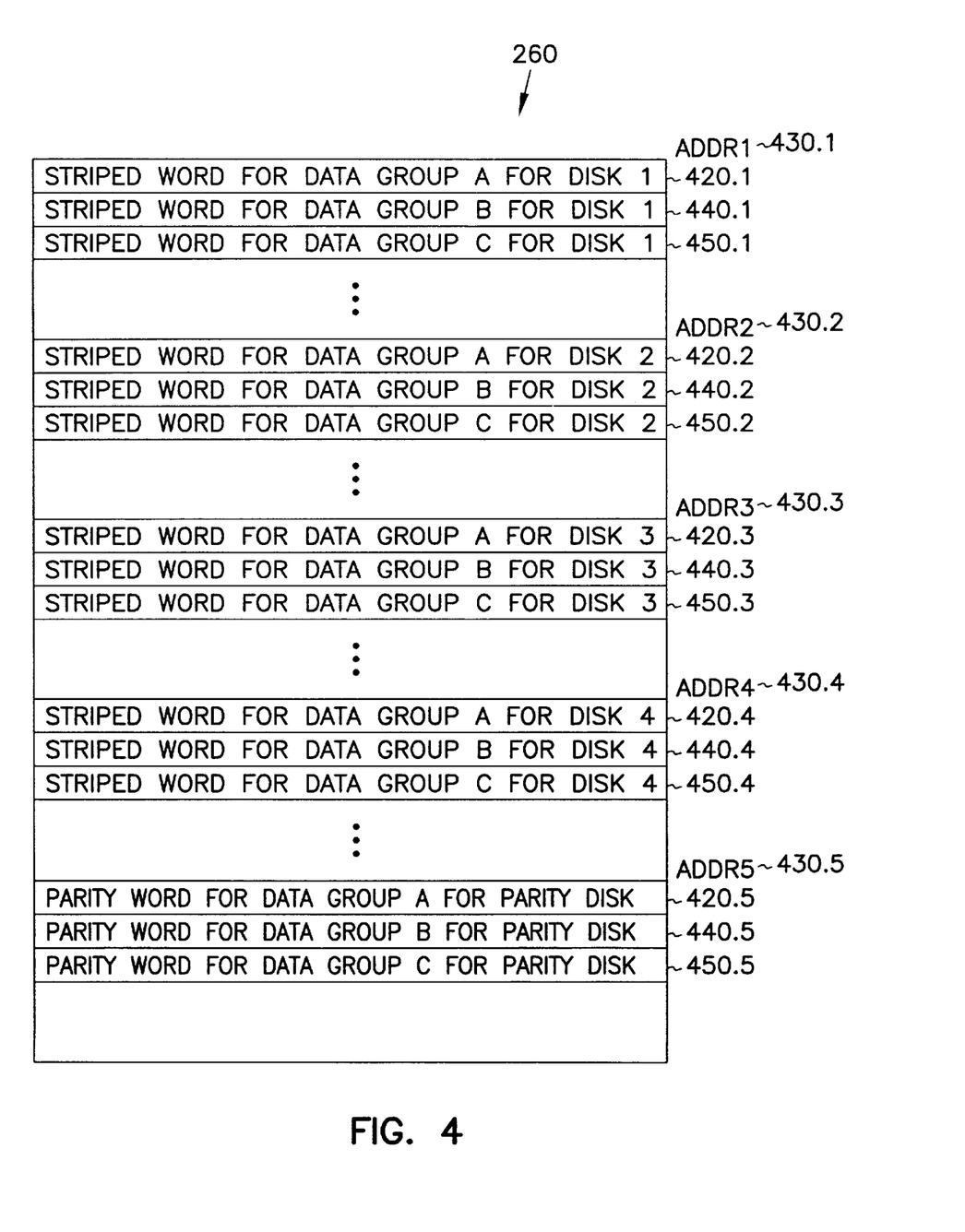
FIG. 4 is a block diagram of the Input/Output buffer associated with the array of disk drive devices.

FIG. 4 shows a block diagram of I/O buffer 260. Suppose that 12 segments of data are processed by serial RAID system 120. In a RAID-3 implementation, each segment would be one word in size. The twelve words of data are divided into sets of 4 to be striped onto the array of disks. The words one through four can be called Data Group A, words five through eight can be called Data Group B, and words nine through twelve can be called Data Group C. Data Group A is striped and the resulting striped words 420.1 through 420.4 are placed in the I/O buffer at address locations 430.1 through 430.4. Parity 420.5 is placed in I/O Buffer 260 at location 430.5. Similarly, the striped and parity words for Data Group B 440.1 through 440.5, and Data Group C 450.1 through 450.5 are stored in the I/O Buffer 260 as well. Striping in RAID-5 is described in the above mentioned U.S. patent application Ser. No. 08/650,336, now pending.

Figure 5:
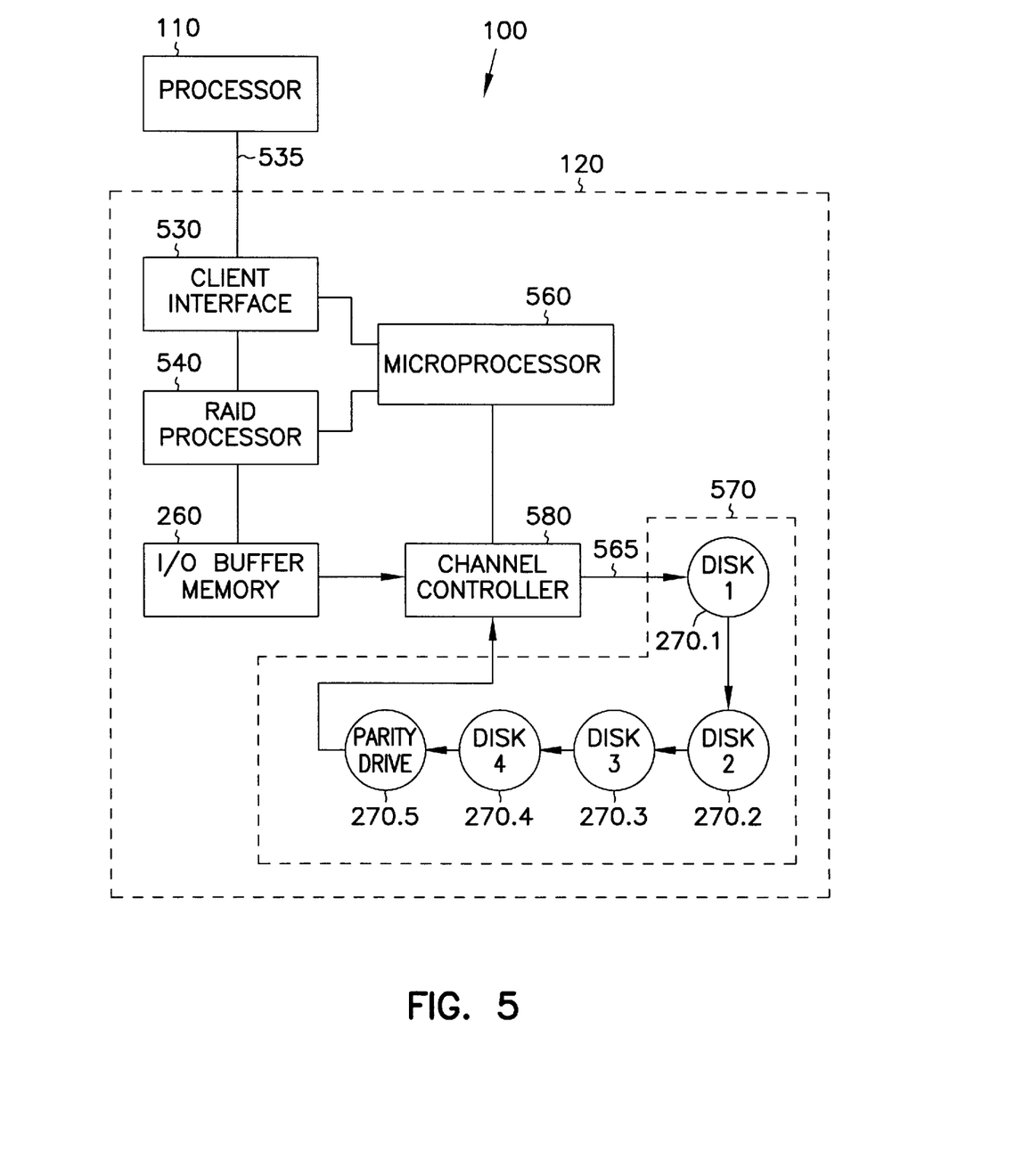
FIG. 5 is a block diagram of a computer system having a computer connected to a serial RAID system, which includes a channel interface, a RAID processor, a channel controller, I/O buffer memory, a microprocessor, and the ring array of disk drive devices.

Once I/O Buffer 260 has been loaded with the proper amount of data, either by a RAID-3 or RAID-5 implementation, I/O buffer data must be written to disk drive array 270.1 through 270.5. FIG. 5 shows one embodiment of the invention as a computer system 100 including a processor 110 connected to serial RAID system 120. Processor 110 may be, for instance, a general purpose computer. Serial RAID system 120 includes channel interface 530, RAID processor 540 operating either in RAID-3 or RAID-5 mode, I/O buffer 260, microprocessor 560 and channel controller 580. Channel controller 580 is connected over a serial network 565 to disk drive array 270.1 through 270.5. Microprocessor 560 is connected to channel interface 530 and channel controller 580 in order to control transfer of data between processor 110 and channel interface 530 and between I/O buffer 260 and disk drive array 270. Microprocessor 560 is also connected to RAID processor 540 for processor initialization.

Data stored in processor 110 is saved to disk drive array 270.1 through 270.5. In the embodiment shown in FIG. 5, data is sent to channel interface 530 via network 535. Channel interface 530 transfers the data received from processor 110 to RAID processor 250. RAID processor 250 stripes the data, and if implemented as RAID-3, it generates parity. The resulting data is stored in I/O buffer 260.

After being accumulated, the data is transferred to each of the disk drives in disk drive array 270.1 through 270.5. Data is sent using a SCSI-2-like protocol embedding an address corresponding to a particular disk drive with the data to be transferred to that drive. In an RAID-3 embodiment, striped data is stored on disks 270.1 through 270.4 and parity data is consistently stored on the same disk 270.5. In a RAID-5 embodiment, striped data and parity data are interleaved across all drives in the disk array 270.1 through 270.5.

In one embodiment, serial network 565 is implemented as a Fibre Channel network. Other communication protocols could also be used. In one Fibre Channel embodiment, channel controller 580 is the Tachyon circuit available from Hewlett-Packard. In addition, a commercial microprocessor, such as the microSPARC, which is available from Sun Systems, Palo Alto, Calif., can be used to implement microprocessor 560. Other channel controllers and microprocessors could also be used.

The striping of the data can be accomplished in many ways. In one of its RAID-3 embodiments, RAID processor 250 stripes data in the following manner. The data in four word registers (word 1 220.1, word 2 220.2, word 3 220.3 and word 4 220.4) are striped by RAID processor 250 so that data register 1 240.1 stores bits 4n, data register 2 240.2 stores bits 4n+1, data register 3 240.3 stores bits 4n+2 and data register 4 240.4 stores bits 4n+3 as n goes from zero to fifteen. The four 64-bit words stored in data registers 240.1 through 240.4 are striped in the following interleaved order:

| Bit | Data Register 1 | Data Register 2 | Data Register 3 | Data Register 4 |
| --- | --- | --- | --- | --- |
| 63 | Word 3, Bit 60 | Word 3, Bit 61 | Word 3, Bit 62 | Word 3, Bit 63 |
| 62 | Word 3, Bit 52 | Word 3, Bit 53 | Word 3, Bit 54 | Word 3, Bit 55 |
| 61 | Word 3, Bit 44 | Word 3, Bit 45 | Word 3, Bit 46 | Word 3, Bit 47 |
| 60 | Word 3, Bit 36 | Word 3, Bit 37 | Word 3, Bit 38 | Word 3, Bit 39 |
| 59 | Word 3, Bit 56 | Word 3, Bit 57 | Word 3, Bit 58 | Word 3, Bit 59 |
| 58 | Word 3, Bit 48 | Word 3, Bit 49 | Word 3, Bit 50 | Word 3, Bit 51 |
| 57 | Word 3, Bit 40 | Word 3, Bit 41 | Word 3, Bit 42 | Word 3, Bit 43 |
| 56 | Word 3, Bit 32 | Word 3, Bit 33 | Word 3, Bit 34 | Word 3, Bit 35 |
| 55 | Word 3, Bit 28 | Word 3, Bit 29 | Word 3, Bit 30 | Word 3, Bit 31 |
| 54 | Word 3, Bit 20 | Word 3, Bit 21 | Word 3, Bit 22 | Word 3, Bit 23 |
| 53 | Word 3, Bit 12 | Word 3, Bit 13 | Word 3, Bit 14 | Word 3, Bit 15 |
| 52 | Word 3, Bit 4 | Word 3, Bit 5 | Word 3, Bit 6 | Word 3, Bit 7 |
| 51 | Word 3, Bit 24 | Word 3, Bit 25 | Word 3, Bit 26 | Word 3, Bit 27 |
| 50 | Word 3, Bit 16 | Word 3, Bit 17 | Word 3, Bit 18 | Word 3, Bit 19 |
| 49 | Word 3, Bit 8 | Word 3, Bit 9 | Word 3, Bit 10 | Word 3, Bit 11 |
| 48 | Word 3, Bit 0 | Word 3, Bit 1 | Word 3, Bit 2 | Word 3, Bit 3 |
| 47 | Word 4, Bit 60 | Word 4, Bit 61 | Word 4, Bit 62 | Word 4, Bit 63 |
| 46 | Word 4, Bit 52 | Word 4, Bit 53 | Word 4, Bit 54 | Word 4, Bit 55 |
| 45 | Word 4, Bit 44 | Word 4, Bit 45 | Word 4, Bit 46 | Word 4, Bit 47 |
| 44 | Word 4, Bit 36 | Word 4, Bit 37 | Word 4, Bit 38 | Word 4, Bit 39 |
| 43 | Word 4, Bit 56 | Word 4, Bit 57 | Word 4, Bit 58 | Word 4, Bit 59 |
| 42 | Word 4, Bit 48 | Word 4, Bit 49 | Word 4, Bit 50 | Word 4, Bit 51 |
| 41 | Word 4, Bit 40 | Word 4, Bit 41 | Word 4, Bit 42 | Word 4, Bit 43 |
| 40 | Word 4, Bit 32 | Word 4, Bit 33 | Word 4, Bit 34 | Word 4, Bit 35 |
| 39 | Word 4, Bit 28 | Word 4, Bit 29 | Word 4, Bit 30 | Word 4, Bit 31 |
| 38 | Word 4, Bit 20 | Word 4, Bit 21 | Word 4, Bit 22 | Word 4, Bit 23 |
| 37 | Word 4, Bit 12 | Word 4, Bit 13 | Word 4, Bit 14 | Word 4, Bit 15 |
| 36 | Word 4, Bit 4 | Word 4, Bit 5 | Word 4, Bit 6 | Word 4, Bit 7 |
| 35 | Word 4, Bit 24 | Word 4, Bit 25 | Word 4, Bit 26 | Word 4, Bit 27 |
| 34 | Word 4, Bit 16 | Word 4, Bit 17 | Word 4, Bit 18 | Word 4, Bit 19 |
| 33 | Word 4, Bit 8 | Word 4, Bit 9 | Word 4, Bit 10 | Word 4, Bit 11 |
| 32 | Word 4, Bit 0 | Word 4, Bit 1 | Word 4, Bit 2 | Word 4, Bit 3 |
| 31 | Word 1, Bit 60 | Word 1, Bit 61 | Word 1, Bit 62 | Word 1, Bit 63 |
| 30 | Word 1, Bit 52 | Word 1, Bit 53 | Word 1, Bit 54 | Word 1, Bit 55 |
| 29 | Word 1, Bit 44 | Word 1, Bit 45 | Word 1, Bit 46 | Word 1, Bit 47 |
| 28 | Word 1, Bit 36 | Word 1, Bit 37 | Word 1, Bit 38 | Word 1, Bit 39 |
| 27 | Word 1, Bit 56 | Word 1, Bit 57 | Word 1, Bit 58 | Word 1, Bit 59 |
| 26 | Word 1, Bit 48 | Word 1, Bit 49 | Word 1, Bit 50 | Word 1, Bit 51 |
| 25 | Word 1, Bit 40 | Word 1, Bit 41 | Word 1, Bit 42 | Word 1, Bit 43 |
| 24 | Word 1, Bit 32 | Word 1, Bit 33 | Word 1, Bit 34 | Word 1, Bit 35 |
| 23 | Word 1, Bit 28 | Word 1, Bit 29 | Word 1, Bit 30 | Word 1, Bit 31 |
| 22 | Word 1, Bit 20 | Word 1, Bit 21 | Word 1, Bit 22 | Word 1, Bit 23 |
| 21 | Word 1, Bit 12 | Word 1, Bit 13 | Word 1, Bit 14 | Word 1, Bit 15 |
| 20 | Word 1, Bit 4 | Word 1, Bit 5 | Word 1, Bit 6 | Word 1, Bit 7 |
| 19 | Word 1, Bit 24 | Word 1, Bit 25 | Word 1, Bit 26 | Word 1, Bit 27 |
| 18 | Word 1, Bit 16 | Word 1, Bit 17 | Word 1, Bit 18 | Word 1, Bit 19 |
| 17 | Word 1 Bit 8 | Word 1, Bit 9 | Word 1, Bit 10 | Word 1, Bit 11 |
| 16 | Word 1, Bit 0 | Word 1, Bit 1 | Word 1, Bit 2 | Word 1, Bit 3 |
| 15 | Word 2, Bit 60 | Word 2, Bit 61 | Word 2, Bit 62 | Word 2, Bit 63 |
| 14 | Word 2, Bit 52 | Word 2, Bit 53 | Word 2, Bit 54 | Word 2, Bit 55 |
| 13 | Word 2, Bit 44 | Word 2, Bit 45 | Word 2, Bit 46 | Word 2, Bit 47 |
| 12 | Word 2, Bit 36 | Word 2, Bit 37 | Word 2, Bit 38 | Word 2, Bit 39 |
| 11 | Word 2, Bit 56 | Word 2, Bit 57 | Word 2, Bit 58 | Word 2, Bit 59 |
| 10 | Word 2, Bit 48 | Word 2, Bit 49 | Word 2, Bit 50 | Word 2, Bit 51 |
| 9 | Word 2, Bit 40 | Word 2, Bit 41 | Word 2, Bit 42 | Word 2, Bit 43 |
| 8 | Word 2, Bit 32 | Word 2, Bit 33 | Word 2, Bit 34 | Word 2, Bit 35 |
| 7 | Word 2, Bit 28 | Word 2, Bit 29 | Word 2, Bit 30 | Word 2, Bit 31 |
| 6 | Word 2, Bit 20 | Word 2, Bit 21 | Word 2, Bit 22 | Word 2, Bit 23 |
| 5 | Word 2, Bit 12 | Word 2, Bit 13 | Word 2, Bit 14 | Word 2, Bit 15 |
| 4 | Word 2, Bit 4 | Word 2, Bit 5 | Word 2, Bit 6 | Word 2, Bit 7 |
| 3 | Word 2, Bit 24 | Word 2, Bit 25 | Word 2, Bit 26 | Word 2, Bit 27 |
| 2 | Word 2, Bit 16 | Word 2, Bit 17 | Word 2, Bit 18 | Word 2, Bit 19 |
| 1 | Word 2, Bit 8 | Word 2, Bit 9 | Word 2, Bit 10 | Word 2, Bit 11 |
| 0 | Word 2, Bit 0 | Word 2, Bit 1 | Word 2, Bit 2 | Word 2, Bit 3 |

Figure 6:
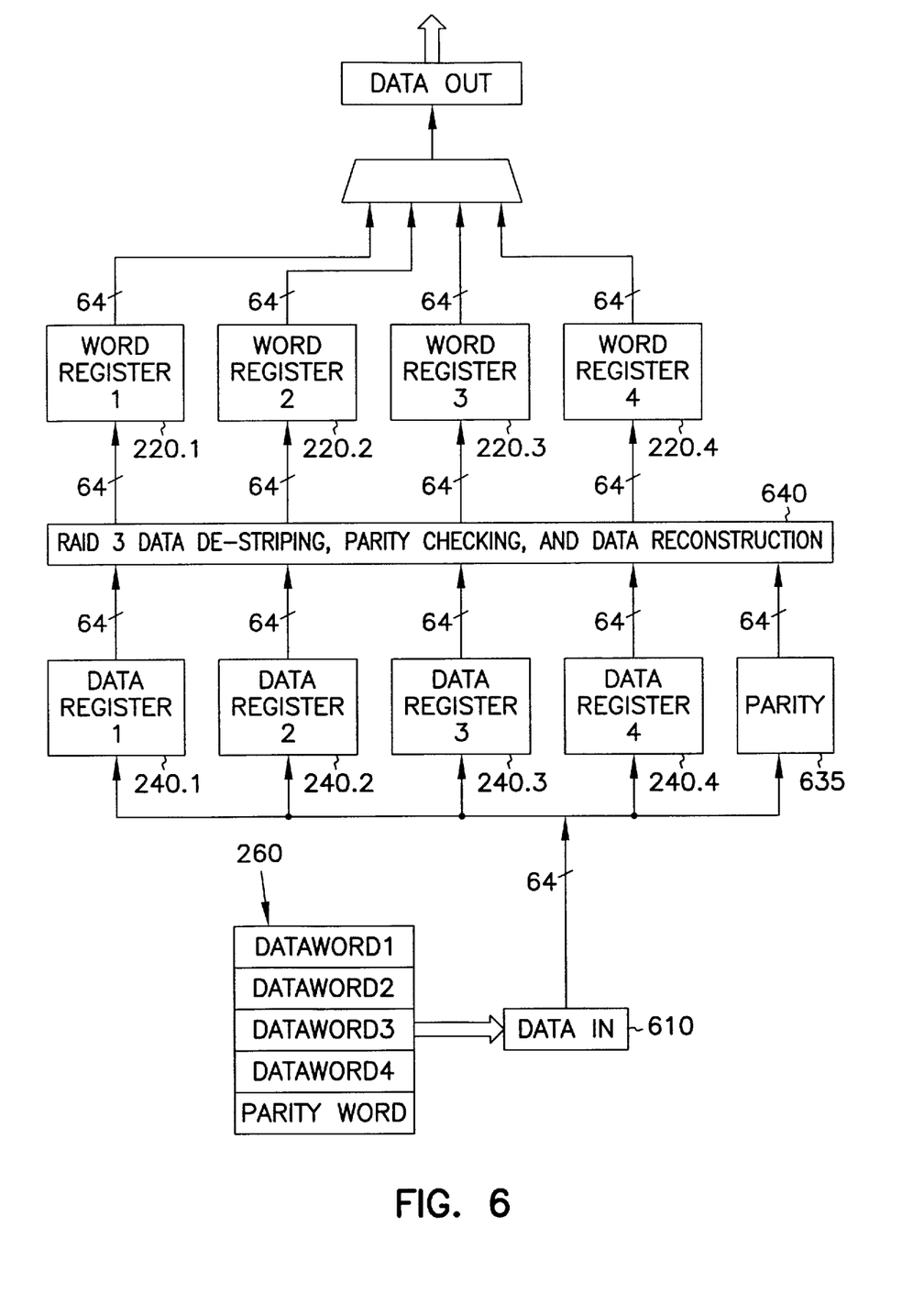
FIG. 6 is a block diagram of one embodiment of the RAID-3 controller, showing the structure of a striped read.
Figure 6A:
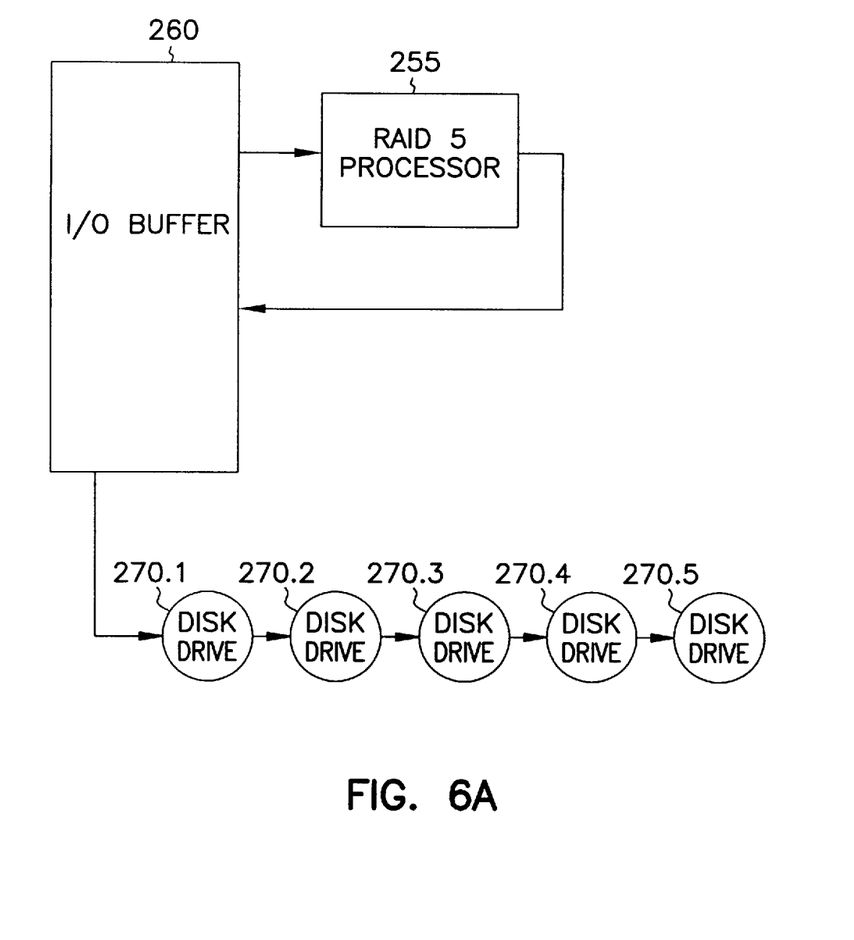
FIG. 6A is a block diagram of one embodiment of the RAID-5 controller, showing the structure of a parity check after a striped read.

The second function of serial RAID system 120 is the retrieval of data from the array of disks 270.1 through 270.5. FIG. 6 is a diagram of RAID processor 540 in one of its RAID-3 embodiments reading striped data. In FIG. 6, striped data is received at data input port 610 from the I/O buffer 260. I/O buffer 260 may be loaded with data by the direction of a Fibre Channel controller. The striped words of data are stored in data registers 240.1 through 240.4 and corresponding parity data is stored in the parity register 635. The data is then de-striped, the parity is checked, and the data is reconstructed if necessary at 640. The resulting de-striped data is stored in word registers 220.1 through 220.4. The data is then output to processor 110. Similarly, FIG. 6A is a diagram of RAID processor 540 in one of its RAID-5 embodiments validating striped data. In FIG. 6A, striped data has been moved into I/O buffer 260. RAID processor 255 checks the parity of striped data and if data is corrupted, may rewrite the correct data to I/O buffer 260. If I/O buffer 260 holds corrected data, such data may be then stored out to disk array 270.1 through 270.5.

Figure 7:
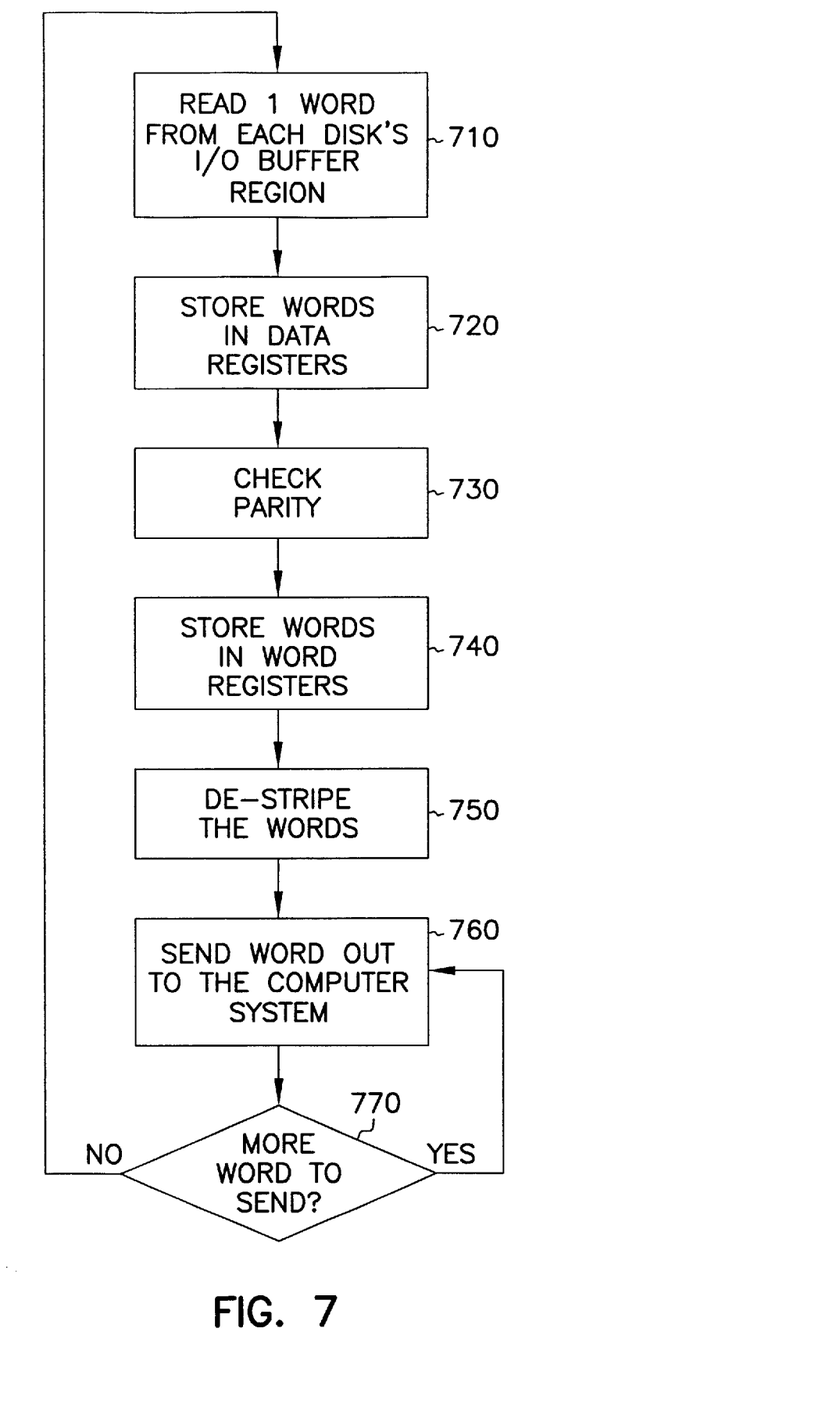
FIG. 7 is a flowchart of the activities handled by one embodiment of the RAID-3 controller, when retrieving data from the array of disk drive devices.

The RAID-3 retrieval process is flowcharted by FIG. 7. Using the address pointers, at step 710, a single word of data is taken from I/O buffer 260 for each disk region. At step 720, these words are stored in data registers 240.1 through 240.4. At step 730, the parity of the data is verified and in step 740, the resulting data is stored in word registers 220.1 through 220.4. If the data is corrupted and one of the disk drives indicates it had an error, then the data is reconstructed. The data is de-striped at step 750. Finally, in steps 760 and 770, the four words are sent out to processor 110.

By serializing the RAID system 120, we solve a previous disadvantage to the RAID-3 and RAID-5 computer storage systems. Such RAID systems traditionally required a parallel array of disk drives. Implementing an disk array increases performance but costs the designer an I/O channel per disk drive. The present invention retains the increased speed performance by substituting a Fibre Channel network for the parallel array of disk drives. By chaining the array serially, serial RAID system 120 decreases the number of I/O channels needed. In a 5 disk drive array, as illustrated, serial RAID system 120 decreases the number of I/O channels used from 5 to 1. In a larger disk array, this channel savings would be even greater.

Other embodiments of the present invention are possible without departing from the scope and spirit of the present invention. For instance, one could design a RAID-3 system based on words greater than 64-bits in length or a RAID-5 system with larger sectors, or a system with a larger array of disk drives or utilizing a different striping order. Other embodiments also include an I/O buffer which stores more than one sector per disk drive, such as an implementation having a one megabyte buffer.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A method for transferring data between a processor and a plurality of disk drives, comprising the steps of:
   providing an I/O buffer, wherein the I/O buffer includes a plurality of I/O buffer segments, including a parity I/O buffer segment and a plurality of data I/O buffer segments, wherein each I/O buffer segment is assigned to a disk drive from the plurality of disk drives;
   providing a channel controller connected to the I/O buffer;
   providing a time multiplexed network connected to the channel controller;
   connecting the plurality of disk drives over the time multiplexed network to the channel controller;
   striping data received from the processor;
   generating parity data for the striped data;
   storing the striped data and the parity data to the I/O buffer, wherein the step of storing includes the steps of:
      writing the parity data to said parity I/O buffer segment; and
      writing a portion of said striped data to each of said plurality of data I/O buffer segments; and
   writing the striped data and parity data stored to the I/O buffer from the I/O buffer to the plurality of disk drives.

2. A method for storing data as recited in claim 1 wherein the step of writing the stored striped data and parity data comprises the step of accumulating a sector of parity data within the I/O buffer before writing the stored striped data and parity data to the plurality of disk drives.

3. A method for transferring data between a processor and a plurality of disk drives, wherein the plurality of disk drives includes a first drive, a second drive, a third drive, and a fourth drive, the method comprising the steps of:
   providing an I/O buffer, wherein the I/O buffer includes a plurality of I/O buffer segments, including a parity I/O buffer segment and a plurality of data I/O buffer segments wherein each I/O buffer segment is assigned to a disk drive from the plurality of disk drives, wherein the plurality of data I/O buffer segments includes a first data I/O buffer segment, a second data I/O buffer segment, a third data I/O buffer segment, and a fourth data I/O buffer segment, wherein the first data I/O buffer segment, the second data I/O buffer segment, the third data I/O buffer segment, and the fourth data I/O buffer segment are assigned to the first, second, third and fourth drives respectively;
   providing a channel controller connected to the I/O buffer;
   providing a time multiplexed network connected to the channel controller;
   connecting the plurality of disk drives over the time multiplexed network to the channel controller;
   striping data received from the processor, wherein the step of striping the data comprises the steps of:
      interleaving bits 4n within a first group of bits;
      interleaving bits 4n+1 within a second group of bits;
      interleaving bits 4n+2 within a third group of bits; and
      interleaving bits 4n+3 within a fourth group of bits, wherein n is an integer from 0 to 15;
   generating parity data for the striped data;
   storing the striped data and the parity data to the I/O buffer, wherein the step of storing includes the steps of:
      writing the parity data to said parity I/O buffer segment; and
      writing a portion of said striped data to each of said plurality of data I/O buffer segments, wherein the step of writing a portion of said striped data includes the step of storing the first group of bits to said first data I/O buffer segment, the second group of bits to said second data I/O buffer segment, the third group of bits to said third data I/O buffer segment and the fourth group of bits to said fourth data I/O buffer segment; and
   writing the striped data and parity data stored to the I/O buffer from the I/O buffer to the plurality of disk drives.

4. A serial RAID system, comprising:
   an I/O interface system; and
   a disk array having a plurality of disk drives and a time multiplexed network, wherein the plurality of disk drives are connected to the I/O interface system by the time multiplexed network;
   wherein, the I/O interface system comprises:
      an I/O buffer memory, wherein the I/O buffer memory includes a plurality of I/O buffer segments, including a parity I/O buffer segment and a plurality of data I/O buffer segments, wherein each I/O buffer segment is assigned to a disk drive from the plurality of disk drives;
      a RAID processor, connected to the I/O buffer memory, wherein the RAID processor stripes data, calculates parity data, saves a portion of the striped data to each data I/O buffer segment and saves the parity data to the parity I/O buffer segment; and
      a channel controller, connected to the I/O buffer memory and to the disk array, wherein the channel controller transfers striped data stored in the plurality of I/O buffer segments and parity data stored in the parity I/O buffer segment over the time multiplexed network to the plurality of disk drives.

5. The serial RAID system, as recited in claim 4 wherein the I/O interface system further comprises a microprocessor, connected to the channel controller, which controls transfer of the striped data and the parity data to the plurality of disk drives.

6. The serial RAID system, as recited in claim 4, wherein the time multiplexed network comprises a serial channel having sufficient bandwidth to supply data to each of the plurality of disk drives.

7. A method for transferring data between a processor and a plurality of disk drives, comprising the steps of:
   providing an I/O buffer, wherein the I/O buffer includes a plurality of I/O buffer segments, including a parity I/O buffer segment and a plurality of data I/O buffer segments, wherein each I/O buffer segment is assigned to a disk drive from the plurality of disk drives;
   providing a channel controller connected to the I/O buffer;
   providing a time multiplexed network connected to the channel controller;
   connecting the plurality of disk drives over the time multiplexed network to the channel controller;

receiving striped data from the I/O buffer;

generating parity data for the striped data;

writing the parity data to the parity I/O buffer segment; and writing the striped data and parity data stored to the I/O buffer to the plurality of disk drives.

8. The method for storing data, as recited in claim 7, wherein the step of receiving striped data from the I/O buffer comprises receiving a plurality of sectors of striped data from the I/O buffer; and wherein the step of generating parity data for the striped data comprises generating a plurality of sectors of parity data for the striped data.

9. A serial RAID system, comprising:

an I/O interface system; and a disk array having a plurality of disk drive and a time multiplexed network, wherein the plurality of disk drives are connected to the I/O interface system by the time multiplexed network;

wherein, the I/O interface system comprises:

an I/O buffer memory, wherein the I/O buffer memory includes a plurality of I/O buffer segments, including a parity I/O buffer segment and a plurality of data I/O buffer segments, wherein each I/O buffer segment is assigned to a disk drive from the plurality of disk drives and wherein each data I/O buffer segment stores striped data;

a RAID processor, connected to the I/O buffer memory, wherein the RAID processor reads striped data from the plurality of data I/O buffer segments, calculates parity data and saves the calculated parity data to the parity I/O buffer segment; and a channel controller, connected to the I/O buffer memory and to the disk array, wherein the channel controller transfers striped data and parity data stored in the I/O buffer memory over the time multiplexed network to the plurality of disk drives.

10. The serial RAID system, as recited in claim 9 wherein the I/O interface system further comprises a microprocessor connected to the channel controller, which controls transfer of the striped data and the parity data to the plurality of disk drives.

11. The serial RAID system, as recited in claim 9, wherein the time multiplexed network comprises a serial channel having sufficient bandwidth to supply data to each of the plurality of disk drives.

* * * * *